Nov. 10, 1925.  W. H. WALTER  1,560,746

EGG TURNER FOR INCUBATORS

Filed Feb. 19, 1925

Inventor
William H. Walter.

Patented Nov. 10, 1925.

1,560,746

UNITED STATES PATENT OFFICE.

WILLIAM H. WALTER, OF DENVER, COLORADO.

EGG TURNER FOR INCUBATORS.

Application filed February 19, 1925. Serial No. 10,268.

*To all whom it may concern:*

Be it known that I, WILLIAM H. WALTER, citizen of the United States of America, residing at Denver, in the city and county of Denver and State of Colorado, have invented certain new and useful Improvements in Egg Turners for Incubators; and I do declare the following to be a full, clear, and exact description of the invention, such as will enable others skilled in the art to which it appertains to make and use the same, reference being had to the accompanying drawings, and to the characters of reference marked thereon, which form a part of this application.

This invention relates to improvements in egg turners for incubators.

In the incubation of eggs by artificial heat, it has been abundantly proven that the best results can only be obtained if the eggs are turned quite frequently, in fact the eggs should be turned many times each day to get the best results. As the present day incubators may contain from fifty to several thousand eggs, it is quite evident that it would be a formidable task to turn each egg several times each day. I am aware that incubators have been so constructed that all of the eggs on one tray may be turned at the same time, thereby reducing the time and labor to a great extent. The turning devices with which I am familiar require that the door of the incubator shall be opened each time, which is highly objectionable.

It is the object of this invention to produce an incubator having means whereby all of the eggs may be turned simultaneously without opening the doors and which at the same time, shall not interfere in the least with the insertion or withdrawal of the trays.

The objects of my invention are attained by means of a construction which I will now describe in detail, reference for this purpose being had to the accompanying drawing in which I have illustrated the preferred form of my invention and in which Fig. 1 is a perspective view of an incubator constructed in accordance with my invention.

Figure 1:
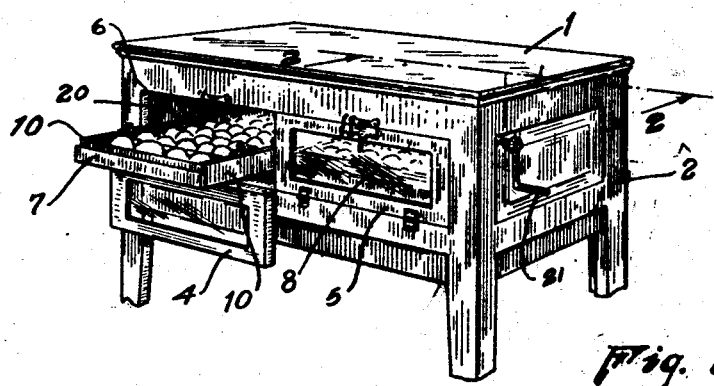
Figure 2:
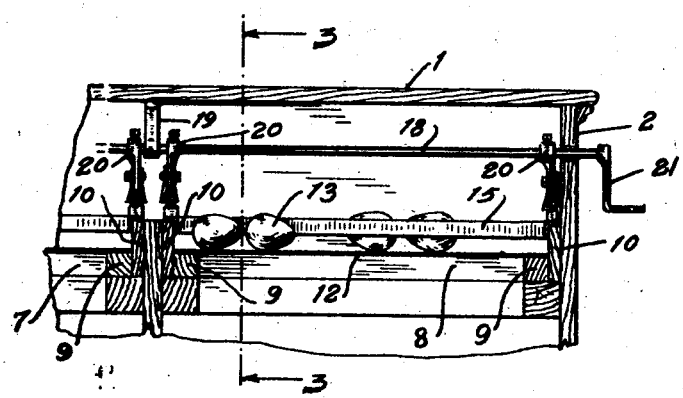
Fig. 2 is a section on line 2—2 Fig. 1 showing the parts to a somewhat larger scale than in Fig. 1.
Figures 3, 4:
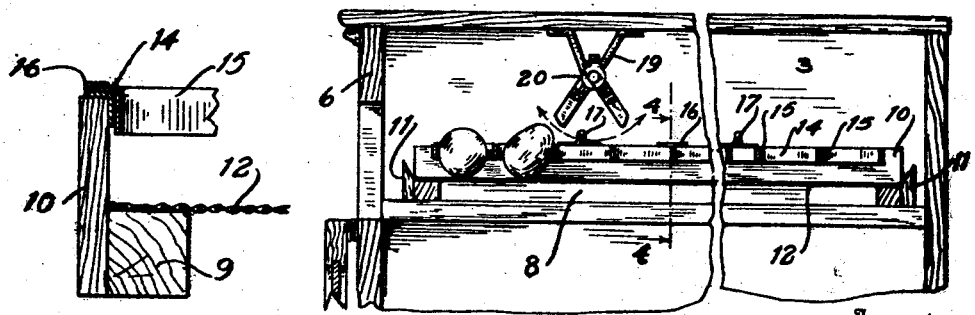
Fig. 3 is a section taken on line 3—3 Fig. 2.
Fig. 4 is a section on line 4—4, Fig. 3.

In the drawing I have shown an incubator box having a top 1, ends 2 and 3, doors 4 and 5 and front 6. I have not made any attempt to show the heating or temperature control means as my invention is not concerned therewith. I have shown the incubator as having two trays 7 and 8 placed side by side in the manner most clearly shown in Fig. 2. Each tray comprises a rectangular framework, one side of which is shown in section in Fig. 4 and designated by the numeral 9. Side pieces 10 are secured to opposite frame members 9 and end pieces 11 to the other opposing frame members. A woven wire screen 12 is secured to the upper surface of the frame members 9 and serves as a support for the eggs 13. Slidably connected to the sides 10, is a grate having side members 14 and parallel transverse bars 15. These bars are spaced a sufficient distance apart to receive the eggs that are thus held in rows. The grates are somewhat shorter than the tray to which they are attached and are slidable to a limited extent. When the grate is moved either to the right or the left (Fig. 3), the eggs will be rolled and if this movement is equal to one-half the circumference of an egg, the eggs may be turned one hundred eighty degrees by each movement of the grate. It is, of course, not necessary to turn the eggs one hundred eighty degrees each time, but this may be done if desired. The side members 14 have an angular cross section, like that shown in Fig. 4 and are secured to the sides 10 by means of hooked members 16. Secured to the upper flange of the members 14 are projections 17 that are spaced equidistantly from the ends so that the rack becomes symmetrical. Pivotally connected with the ends 2 and 3 is a shaft 18. This shaft extends the entire length of the incubator and may be supported by brackets 19 wherever necessary. Clamped to the shaft 18 at points directly above the projections 17 are V-shaped members 20 whose tips move along the path indicated by the double pointed arcuate arrow in Fig. 3. To the outer end of the shaft 18, I connect a crank 21. When the trays are inserted into the incubator, the racks are adjusted so that the projections 17 project inside of the arc of the locus of the points of the V-shaped members 20. By rotating the shaft, the tips of members 20 will engage the projections 17 and slide the rack thereby turning the eggs. If it is thought to be desirable, suitable stops may be provided for the purpose of preventing the shaft to be rotated so far that the engaging tip of member 20 will pass over the projections 17, as when this occurs it is not possible to move the rack back for the reason that the member 20 will not engage the projections 17. It is often necessary to remove the trays and this should be done without hindrance from the turning device. To accomplish this the angle between the two sides of the members 20 is preferably so great that a straight line joining the tips of the arms will pass over the top of the corresponding projection 17, when the parts occupy the position shown in Fig. 2. This is not an absolute necessity but it is desirable for the reason that when the parts are so related the trays may be inserted and removed without the slightest interference.

I wish to call particular attention to the fact that the members 20 are entirely disconnected from the trays and racks, except when the racks are being reciprocated and to the further fact that my operating means is accessible from the outside so that the eggs may be turned without opening the doors to the incubator.

It is evident that my operating means may be employed with incubators having any number of trays and that the eggs on all of the trays may be simultaneously turned.

Having now described my invention what I claim as new is:

1. In an incubator, in combination, a housing, an egg supporting tray slidably secured thereto, a rack slidably secured to the tray, said rack having spaced parallel bars adapted to receive between them a row of eggs, a shaft rotatably mounted in the housing, said shaft having one end extending to the outside of the housing, means secured to the end of the shaft for rotating the same, upwardly extending projections on the rack and means comprising angularly related arms secured to the shaft, said arms being adapted to engage the projections to slide the rack when the shaft is rotated.

2. In an incubator, in combination, a housing, a tray slidably secured therein, a rack slidably connected to the tray, said rack having upwardly extending projections, a shaft rotatably mounted in the housing, said shaft having one end accessible from the outside of the housing, and V-shaped members secured to the shaft, said members being located directly above the projections and normally out of contact therewith and adapted to engage the projections when the shaft is rotated whereby the rack may be shifted on the tray by rotating the shaft.

3. In an incubator, in combination, a housing, a tray slidably secured therein, a rack slidably connected to the tray, opposite sides of said rack having upwardly extending projections, a shaft rotatably mounted in the housing at a point above said projections, said shaft extending transversely of the direction of movement of said rack, said shaft having one end accessible from the outside of the housing, a crank secured to the accessible portion of said shaft for rotating the same, a V-shaped member secured to said shaft at a point directly over each of said projections, the sides of said V-shaped member being of such length and so related to the projections that when the bisector of the angle between said sides is vertical, then the tray and frame may be moved freely without having the top of the projection come into contact with the tips of said sides, the tops of the projections extending above the locus of the tips of said sides when the projections are in normal position whereby the rack may be moved on the tray, for the purpose of turning the eggs, when the shaft is rotated about its axis.

In testimony whereof I affix my signature.

WILLIAM H. WALTER.